United States Patent [19]
Jamal et al.

[11] Patent Number: 5,956,368
[45] Date of Patent: Sep. 21, 1999

[54] DOWNLINK CHANNEL HANDLING WITHIN A SPREAD SPECTRUM COMMUNICATIONS SYSTEM

[75] Inventors: Karim Jamal, Tokyo; Riaz Esmailzadeh, Mita Mae-ku, both of Japan; Erik Dahlman, Bromma, Sweden

[73] Assignee: Telefonaktiebolaget LM Ericsson, Stockholm, Sweden

[21] Appl. No.: 08/924,709

[22] Filed: Aug. 29, 1997

[51] Int. Cl.⁶ .................................................. H04K 1/00
[52] U.S. Cl. ............................................. 375/206; 370/342
[58] Field of Search ...................... 375/200, 206; 370/335, 342, 479, 503, 524, 527, 529, 208, 209; 455/522

[56] References Cited

U.S. PATENT DOCUMENTS

| | | | |
|---|---|---|---|
| 5,345,467 | 9/1994 | Lomp et al. | 370/331 |
| 5,799,010 | 8/1998 | Lomp et al. | 370/342 |
| 5,805,584 | 9/1998 | Kingston et al. | 375/206 |

FOREIGN PATENT DOCUMENTS

| | | | |
|---|---|---|---|
| 0704987 | 4/1996 | European Pat. Off. | |
| WO 97/31428 | 8/1997 | WIPO | |

OTHER PUBLICATIONS

EPO Standard Search Report No. RS 100267 US, dated Mar. 2, 1998.

Baier, Alfred, et al., "Design Study for a CDMA–Based Third–Generation Mobile Radio System", IEEE Journal on Selected Areas in Communications, vol. 12, No. 4, May 1994, pp. 733–743.

Higuchi, Kenichi, et al. "Fast Cell Search Algorithm using Long Code Masking in DS–CDMA Asynchronous Cellular System", Technical Report of IEICE, Jan. 1997, pp. 1–6 (with translation).

*Primary Examiner*—Tesfaldet Bochure
*Attorney, Agent, or Firm*—Jenkins & Gilchrist PC

[57] ABSTRACT

With respect to a direct sequence, code division multiple access spread spectrum transmitter, symbol information relating to dedicated/common channels (such as the traffic or control channels) is spread to generate a plurality of corresponding dedicated/common channel intermediate signals. These intermediate signals are then summed to generate an output signal that is scrambled by a selected scrambling code. Symbol information relating to acquisition-related channels (such as synchronization information or the pilot or long code group code channels) is also spread to generate a plurality of corresponding acquisition-related intermediate signals. These acquisition-related intermediate signals are then selectively added to the scrambled output signal producing a downlink signal for multi-channel transmission over a communications medium sharing one transmission communications frequency.

18 Claims, 3 Drawing Sheets

DOWNLINK CHANNEL HANDLING WITHIN A SPREAD SPECTRUM COMMUNICATIONS SYSTEM

BACKGROUND OF THE INVENTION

1. Technical Field of the Invention

The present invention relates to spread spectrum communications systems and, in particular, to the handling of the various channels transmitted on the downlink from a base station operating in a spread spectrum communications system.

2. Description of Related Art

The cellular telephone industry has made phenomenal strides in commercial operations throughout the world. Growth in major metropolitan areas has far exceeded expectations and is outstripping system capacity. If this trend continues, the effects of rapid growth will soon reach even the smallest markets. The predominant problem with respect to continued growth is that the customer base is expanding while the amount of electromagnetic spectrum allocated to cellular service providers for use in carrying radio frequency communications remains limited. Innovative solutions are required to meet these increasing capacity needs in the limited available spectrum as well as to maintain high quality service and avoid rising prices.

Currently, channel access is primarily achieved using Frequency Division Multiple Access (FDMA) and Time Division Multiple Access (TDMA) methods. In frequency division multiple access systems, a physical communication channel comprises a single radio frequency band into which the transmission power of a signal is concentrated. In time division multiple access systems, a physical communications channel comprises a time slot in a periodic train of time intervals over the same radio frequency. Although satisfactory performance is being obtained from FDMA and TDMA communications systems, channel congestion due to increasing customer demand commonly occurs. Accordingly, alternate channel access methods are now being proposed, considered and implemented.

Spread spectrum comprises a communications technique that is finding commercial application as a new channel access method in wireless communications. Spread spectrum systems have been around since the days of World War II. Early applications were predominantly military oriented (relating to smart jamming and radar). However, there is an increasing interest today in using spread spectrum systems in communications applications, including digital cellular radio, land mobile radio, and indoor/outdoor personal communication networks.

Spread spectrum operates quite differently from conventional TDMA and FDMA communications systems. In a direct sequence code division multiple access (DS-CDMA) spread spectrum transmitter, for example, a digital symbol stream for a given dedicated or common channel at a basic symbol rate is spread to a chip rate. This spreading operation involves applying a channel unique spreading code (sometimes referred to as a signature sequence) to the symbol stream that increases its rate (bandwidth) while adding redundancy. Typically, the digital symbol stream is multiplied by the unique digital code during spreading. The intermediate signal comprising the resulting data sequences (chips) is then added to other similarly processed (i.e., spread) intermediate signals relating to other channels. A base station unique scrambling code (often referred to as the "long code" since it is in most cases longer than the spreading code) is then applied to the summed intermediate signals to generate an output signal for multi-channel transmission over a communications medium. The dedicated/common channel related intermediate signals advantageously then share one transmission communications frequency, with the multiple signals appearing to be located on top of each other in both the frequency domain and the time domain. Because the applied spreading codes are channel unique, however, each intermediate signal transmitted over the shared communications frequency is similarly unique, and through the application of proper processing techniques at the receiver may be distinguished from others.

In the DS-CDMA spread spectrum mobile station (receiver), the received signals are recovered by applying (i.e., multiplying, or matching) the appropriate scrambling and spreading codes to despread, or remove the coding from the desired transmitted signal and return to the basic symbol rate. Where the spreading code is applied to other transmitted and received intermediate signals, however, only noise is produced. The despreading operation thus effectively comprises a correlation process comparing the received signal with the appropriate digital code to recover the desired information from the channel.

In one known prior art transmitter implementation, the spreading process used by the base station for the common channel type broadcast control channel (BCCH) is a little different than that implemented with respect to the other dedicated/common channels. The pilot codes for the base station, as well as the long (scrambling) code group codes that provide information indicative of which long code is being used by the base station, are embedded within the broadcast control channel information. These pilot codes and long code group codes are transmitted periodically. The time intervals during which these codes are sent last for one symbol, and are referred to as "long code masked symbols". At each instance of long code masked symbol transmission, the pilot codes and the long code group codes are sent instead of sending the broadcast control channel. This is accomplished by turning off the broadcast control channel information stream, and instead transmitting the pilot code modulated by a known symbol (such as "+1"). At the same time, the long code group code is similarly transmitted, again modulated by a known symbol (such as "+1") As these codes are transmitted simultaneously, it is preferable that the pilot codes and the long code group codes be orthogonal to each other. Furthermore, for only these code transmissions, the base station unique digital code (the "long code") is removed. This is accomplished, for example, by multiplying the pilot codes and the long code group codes by the complex conjugate of the long code.

From an implementation point of view, the scheme described above for implementing the transmission of the long code masked symbols requires complicated and specific code channel signal processing (both on the hardware side and software side) for the broadcast control channel that differs from that required for the other dedicated/common channels. It would be more economical and efficient to have a unified processing resource (hardware and/or software) for all channels on the downlink. It is also recognized that during the transmission of the long code masked symbols no broadcast control channel symbols are sent. This adversely affects the bit rate of the broadcast control channel. Preferably, the unified processing resource should improve the information transmission rate of the broadcast control channel.

SUMMARY OF THE INVENTION

Dedicated and common channel symbols for a direct sequence, code division multiple access spread spectrum transmitter are spread through application of appropriate spreading codes to generate a plurality of corresponding dedicated/common channel intermediate signals. These intermediate signals are then summed to generate an output signal that is scrambled by a selected scrambling code. The dedicated and common channels comprise such channels as traffic channels and control channels. The symbols for channels relating to acquisition-related activities, comprising, for example, synchronization and/or reception of the pilot channel and long code group channel, are also spread through application of an appropriate spreading code to generate a plurality of corresponding acquisition-related intermediate signals. The acquisition-related intermediate signals are then selectively added to the scrambled output signal relating to the dedicated/common channel intermediate signals producing a transmitter downlink signal for multi-channel transmission over a communications medium. The intermediate signals for the dedicated/common channels and the acquisition-related channels advantageously then share one transmission communications frequency, with the multiple intermediate signals for these channels appearing to be located on top of each other in both the frequency domain and the time domain.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1A:
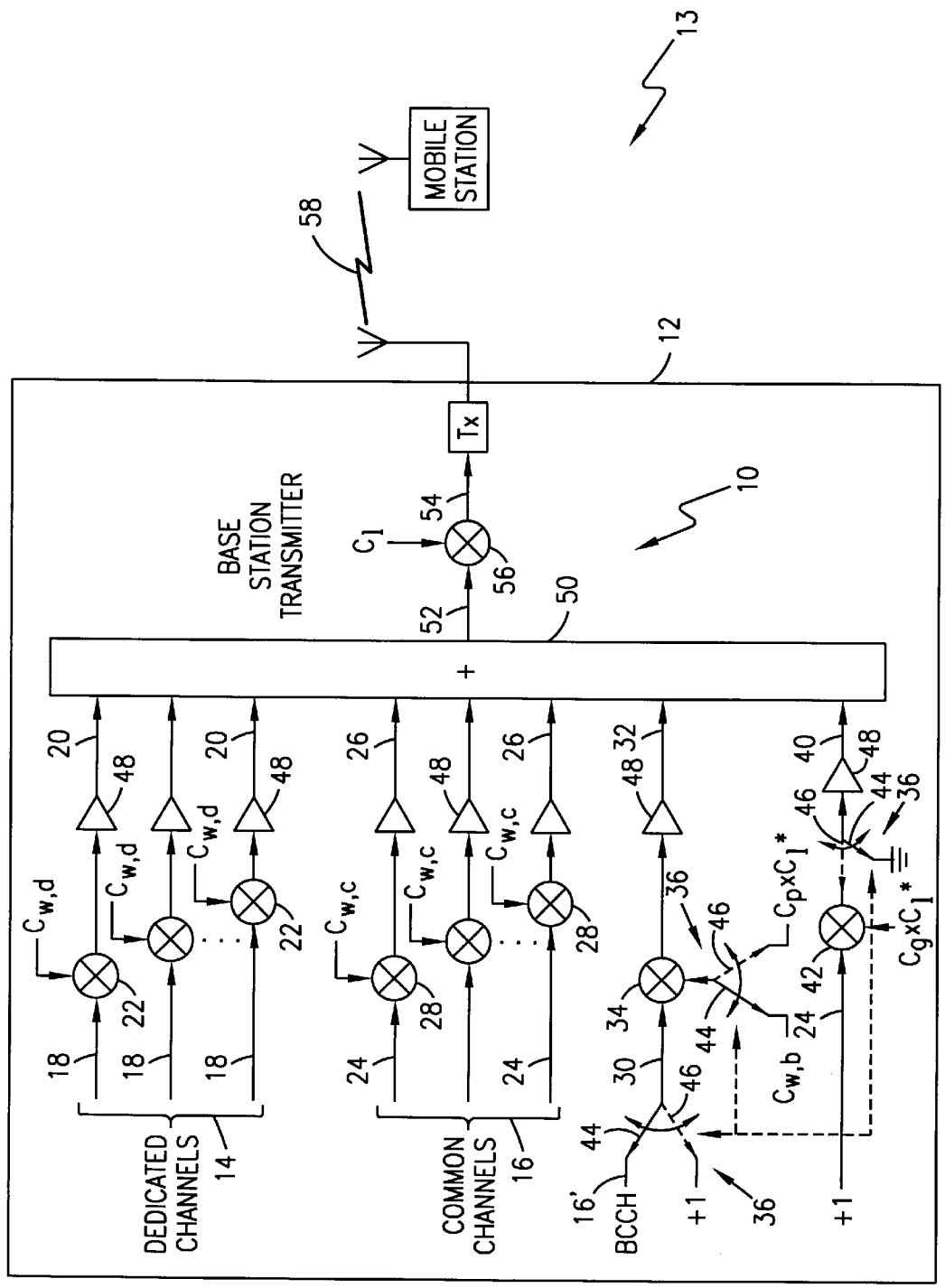
FIGS. 1A and 1B are block diagrams of a prior art direct sequence code division multiple access (DS-CDMA) spread spectrum transmitter such as that which would be implemented in a base station of a cellular communications system.

Reference is now made to FIG. 1A wherein there is shown a block diagram of a prior art direct sequence code division multiple access (DS-CDMA) spread spectrum transmitter 10 such as that which would be implemented in a base station 12 of a cellular communications system 13. The transmitter 10 transmits a number of channels on the downlink. These channels include both dedicated channels 14 (including both traffic and control channels) and common channels 16 (also including both traffic and control channels). For each of the dedicated channels 14, a digital symbol stream at a basic symbol rate is received on line 18. This received digital symbol stream is then spread to a transmit chip rate for output as dedicated channel intermediate signal on line 20. This spreading operation involves applying a channel unique spreading code $C_{w,d}$ (often referred to as the "signature" sequence) to the received digital symbol stream that increases its rate. A Walsh type code (w) may, for example, be used for the unique spreading code of the dedicated (d) channel. The application of the channel unique spreading code is typically made through the use of a spreader 22 implementing, for example, a multiplication or modulo-two addition.

A similar process is implemented for each of the common channels 16 (except for the common broadcast control channel (BCCH) 16' as will be described). A digital symbol stream at a basic symbol rate for the common channel is received on line 24. This received digital symbol stream is then spread to a transmit chip rate for output as common channel intermediate signal on line 26. This spreading operation involves applying a channel unique spreading code $C_{w,c}$ to the received digital symbol stream that increases its rate. A Walsh type code (w) may, for example, again be used for the unique spreading code of the common (c) channel. The application of the channel unique spreading code is typically made through the use of a spreader 28.

With respect to the broadcast control channel 16', a BCCH digital symbol stream at a basic symbol rate, or a known symbol (such as "+1"), is received on line 30. This received digital symbol stream (or known symbol) is then spread to a transmit chip rate for output as BCCH intermediate signal on line 32. This spreading operation involves applying either: (1) a channel unique spreading code $C_{w,b}$ to the received digital symbol stream; or, (2) a pilot code $C_p$ to the known symbol. A Walsh type code (w) may, for example, again be used for the unique digital code of the transmission (b) channel, and an orthogonal gold code may be used for the pilot channel. The application of either code is typically made through the use of a spreader 34. The selection between the BCCH digital symbol stream or known symbol for input, as well as the selection between the codes for application by spreader 34, is made by hardware and/or software switch 36. Thus, it is seen that the processing of the broadcast control channel 16' is handled differently from the other common channels 16 due to the fact that the pilot codes for the base station used for receiver acquisition operations are selectively embedded by the action of switch 36 within the broadcast control channel information.

Further, with respect to the broadcast control channel 16', a known symbol (such as "+1"), is received on line 38. This known symbol is then spread to a transmit chip rate for output as a long code group intermediate signal on line 40. This spreading operation involves applying a long code group code $C_g$ to the known symbol. An orthogonal gold code may, for example, be used for the long code group code. The application of the long code group code is typically made through the use of a spreader 42. Output of the long code group intermediate signal is controlled by switch 36 in conjunction with the selection between the BCCH digital symbol stream or known symbol for input on line 30, as well as the selection between the codes for application by spreader 34 in generating the BCCH intermediate signal. Thus, it is seen that the processing of the broadcast control channel 16' is further handled differently from the other common channels 16 due to the fact that the long code group codes used for receiver acquisition operations by identifying, to some degree, the long code for the base station, are selectively embedded by the action of switch 36 within the broadcast control channel information.

In accordance with this selection embedding operation performed by switch 36, when the switch is in a first physical/logical position (as illustrated by solid line arrow 44), the BCCH digital symbol stream is selected for input on line 30, the BCCH intermediate signal carries broadcast control channel information, and no long code group intermediate signal is generated. Conversely, when the switch is in a second physical/logical position (as illustrated by broken line arrow 46), the known symbol is selected for input on line 30, the BCCH intermediate signal carries the pilot channel, and the long code group intermediate signal is generated. The pilot codes and long code group codes are simultaneously transmitted on a periodic basis. The time instants when they are sent last for a duration of one symbol. At each instance of transmission, the switch 36 selects the second position (indicated by arrow 46), and the pilot codes and the long code group codes are sent instead of sending the broadcast control channel information. As the pilot codes and long code group codes are transmitted simultaneously, it is preferable that the pilot codes and the long code group codes be orthogonal to each other.

Each of the channels 14, 16 or 16' typically includes a power adjustment device 48 that processes the generated plural intermediate signals as selected by operation of switch 36 and received on lines 20, 26, 32 and 40, to effectuate individual control over the transmission power of each channel. The power controlled intermediate signals are then added together by adder 50 to generate a combined signal on line 52. This combined signal is then scrambled by a base station unique scrambling code $C_1$ (referred to as the "long code", and identified to some degree by the long code group $C_g$) to generate an output signal on line 54 for multi-channel transmission over a communications medium 58. Any suitable scrambling code may be used for the long code. The application of the long code is typically made through the use of a scrambler 56 implementing, for example, a multiplication or modulo-two addition. The dedicated/common channel related intermediate signals advantageously then share one transmission communications frequency on the communications medium 58, with the multiple signals appearing to be located on top of each other in both the frequency domain and the time domain.

With respect to the simultaneously transmitted pilot code and the long code group code, the base station unique scrambling code (the "long code") is preferably removed. This facilitates detection by the receiver of the pilot code during the searching operation without having to have prior knowledge of the long code being used to scramble the transmitted dedicated and common channel information. With detection of the pilot code, the receiver may synchronize itself with the base station in order to find downlink chip boundaries, symbol boundaries and slot boundaries. Furthermore, with detection of the long code group code, an indication is provided of the long code used for scrambling the dedicated/common channels, thus allowing the receiver during searching operation to narrow down the number of long codes that must be searched before being able to descramble the dedicated/common channels.

The removal of the long code from the simultaneously transmitted pilot code and the long code group code is referred to in the prior art as masking. Accordingly, the simultaneously transmitted pilot code and the long code group code are collectively referred to as "long code masked symbols". To accomplish this masking, the pilot codes $C_p$ and the long code group codes $C_g$ are, for example, multiplied by the complex conjugate $C_1^*$ of the long code $C_1$ prior to being multiplied with the known symbol as input on lines 30 and 38, respectively.

Figure 1B:
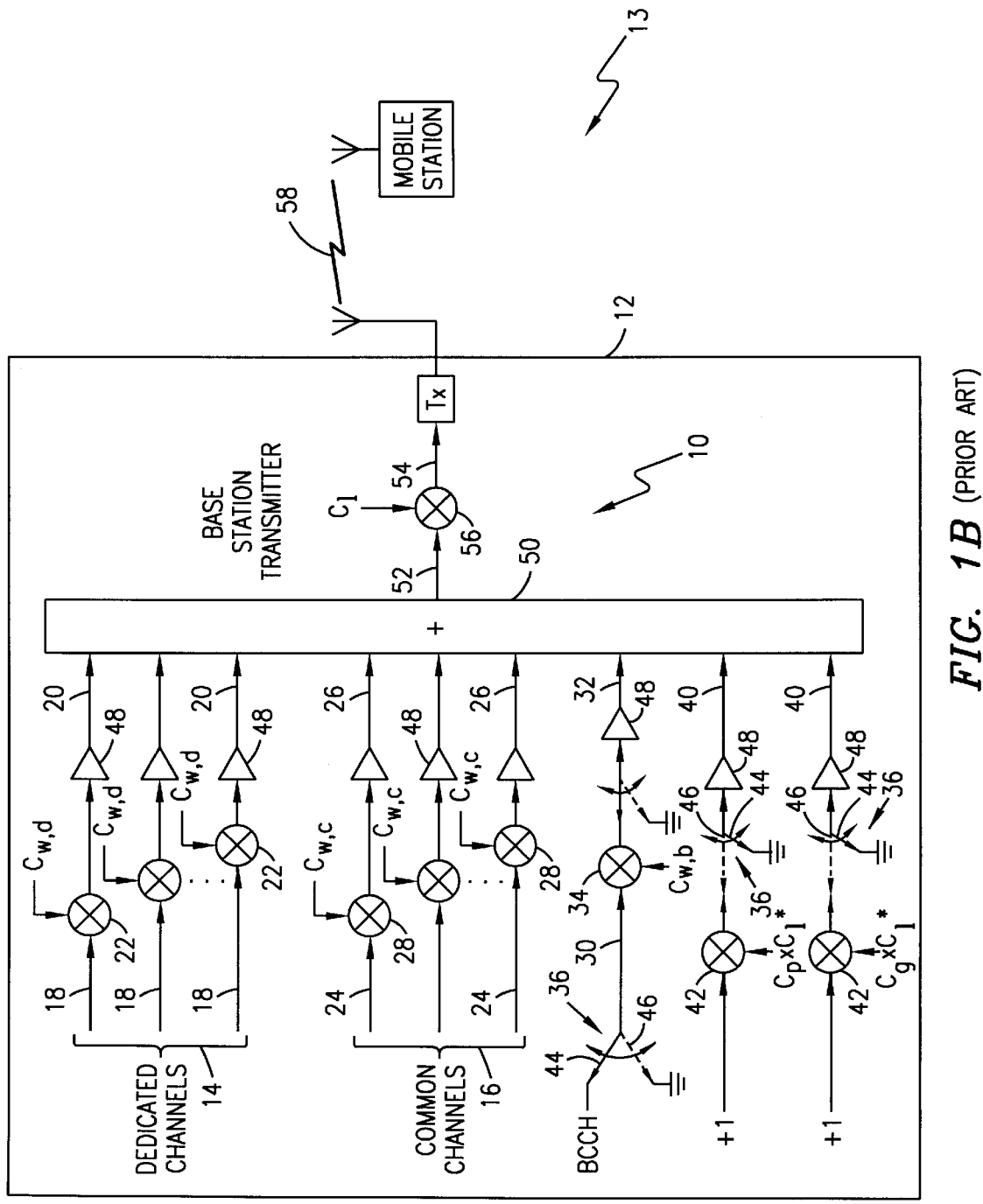

An alternative implementation of the prior art direct sequence code division multiple access spread spectrum transmitter 10 of FIG. 1A is shown in FIG. 1B. In the transmitter 10 of FIG. 1B, like or similar elements with respect to FIG. 1A are identified with the same reference numerals. Operation of the transmitters 10 is substantially the same. The transmitter 10 of FIG. 1B differs in that separated handling of the broadcast control channel and pilot channel is provided.

Figure 2:
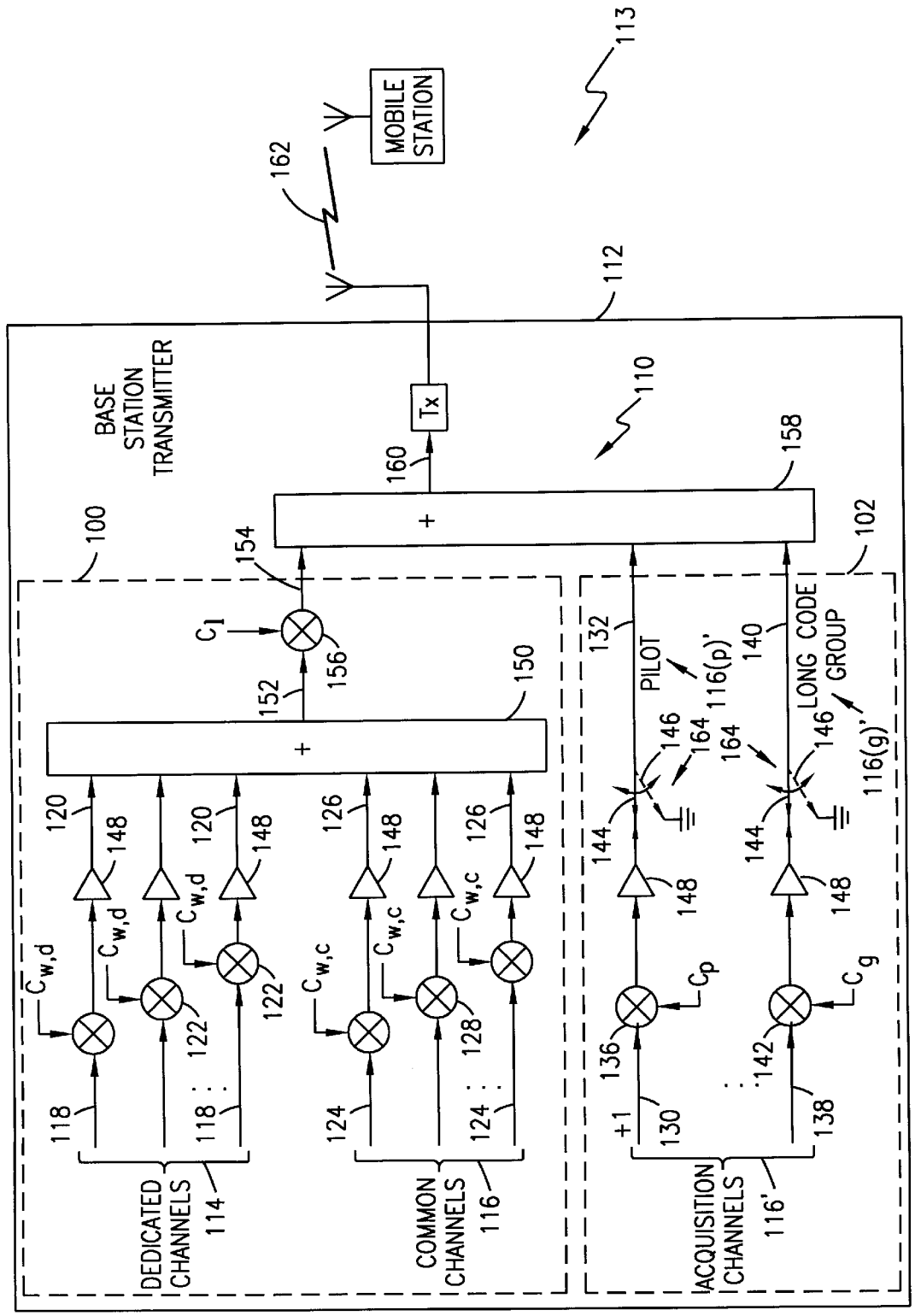
FIG. 2 is a block diagram of a present invention direct sequence code division multiple access spread spectrum transmitter such as that which would be implemented in a base station of a cellular communications system.

Reference is now made to FIG. 2 wherein there is shown a block diagram of a present invention direct sequence code division multiple access (DS-CDMA) spread spectrum transmitter 110 such as that which would be implemented in a base station 112 of a cellular communications system 113. The transmitter 110 transmits a number of channels on the downlink, and includes a block of channel equipment 100 for information carrying channels including both dedicated channels 114 (including both traffic and control channels) and common channels 116 (also including both traffic and control channels). For each of the dedicated channels 114, a digital symbol stream at a basic symbol rate is received on line 118. This received digital symbol stream is then spread to a transmit chip rate for output as dedicated channel intermediate signal on line 120. This spreading operation involves applying an individual channel unique spreading code $C_{w,d}$ (often referred to as the "signature" sequence) to the received digital symbol stream that increases its rate. A Walsh type code (w) may, for example, be used for the unique spreading code of the dedicated (d) channel. The application of the channel unique spreading code is typically made through the use of a spreader 122 implementing, for example, a multiplication or modulo-two addition.

A similar process is implemented for each of the common channels 116 (including the common broadcast control channel (BCCH)). A digital symbol stream at a basic symbol rate for the common channel is received on line 124. This received digital symbol stream is then spread to a transmit chip rate for output as common channel intermediate signal on line 126. This spreading operation involves applying an individual channel unique spreading code $C_{w,c}$ to the received digital symbol stream that increases its rate. A Walsh type code (w) may, for example, again be used for the unique spreading code of the common (c) channel. The application of the channel unique spreading code is typically made through the use of a spreader 128.

Each of the channels 114 or 116 may include a power adjustment device 148 that processes the generated plural dedicated and common channel intermediate signals received on lines 120 and 126 to effectuate individual control over the transmit power of each channel. The power controlled intermediate signals are then added together by adder 150 to generate a combined signal on line 152. This combined signal is then scrambled by a base station unique scrambling code $C_1$ (referred to as the "long code") to generate an output signal on line 154 for multi-channel transmission over a communications medium. Any suitable scrambling code may be used for the long code. The application of the long code is typically made through the use of a scrambler 156 implementing, for example, a multiplication or modulo-two addition.

The transmitter 110 further includes a block of channel equipment 102 for transmission of acquisition-related channels 116' such as those for use in base station acquisition by a mobile station (like the pilot codes $C_p$ and long code groups codes $C_g$) which do not use either the short Walsh type codes $C_w$ for spreading or the long codes $C_1$ for scrambling used by the dedicated channels 114 or common channels 116. These codes are used for receiver acquisition operations, and are collectively commonly referred to in the prior art as the "long code masked symbols" since they are transmitted with the long code $C_1$ removed. For example, with a pilot channel 116(p)' one of these channels 116' (comprising a primary synchronization channel), a known symbol (such as "+1") is received on line 130. This received known symbol is then spread to a transmit chip rate for output as pilot channel intermediate signal on line 132. This spreading operation involves applying a pilot code $C_p$ to the received digital symbol stream that increases its rate. An orthogonal gold code may, for example, be used for the pilot channel. The application of the pilot code is typically made through the use of a spreader 136.

Further, for example, a similar process is implemented for a long code group channel 116(g)' one of these channels 116' (comprising a secondary synchronization channel). A symbol is received on line 138. This possibly known symbol is then spread to a transmit chip rate for output as a long code group intermediate signal on line 140. This spreading operation involves applying a long code group code $C_g$ to the known symbol, that increases its symbol rate. An orthogonal gold code may, for example, be used for the long code group code. The application of the long code group is typically made through the use of a spreader 142.

Each of the channels 116' may include a power adjustment device 148 that processes the generated plural intermediate signals received on lines 132 and 140 to effectuate individual control over the transmit power of each channel. The power controlled intermediate signals for the channels 116' are then selectively added together with the scrambled combined output signal received on line 154 by adder 158 to generate a transmitter output downlink signal on line 160 for transmission. The power control process may, if necessary, be implemented in conjunction with the power control exercised over the dedicated channels 114 and common channels 116 to maintain a substantially constant power output from the transmitter 110 as various ones of channel 116' intermediate signals are added to and deleted from the overall transmitter output signal on line 160. The dedicated/common channels 114 and 116 and acquisition-related channel 116' of the output signal advantageously then share one transmission communications frequency on the communications medium 162, with the multiple signals appearing to be located on top of each other in both the frequency domain and the time domain.

Selective addition of each channel 116' intermediate signal (such as the pilot code intermediate signal or the long code group intermediate signal) used for receiver acquisition operations to the scrambled output signal for the dedicated/common channels is controlled by a plurality of hardware and/or software switches 164. One switch 164 is provided for each individual intermediate signal, with the plurality of switches being independently or commonly selected. In accordance with this selection operation performed by switches 164, when an individual one of the switches is in a first physical/logical position (as illustrated by solid line arrow 144), the corresponding intermediate signal is passed on to the power adjustment device 148 and adder 158. Conversely, when the switch is in a second physical/logical position (as illustrated by broken line arrow 146), no corresponding intermediate signal is passed. The channel 116' intermediate signals (such as for the pilot codes and long code group codes) are transmitted on a periodic basis. At each instance of transmission, the appropriate switch 164 selects the first position (indicated by arrow 144), and the corresponding intermediate signal of the channels 116' is added to, and transmitted with, the dedicated channels 114 and common channels 116.

With respect to both implementation and operation, the transmitter 110 of the present invention is notably more efficient and economical than the prior art transceiver 10 of FIG. 1. First, it is noted that the signal processing (both from a hardware and a software perspective) used for the broadcast control channel (BCCH) is the same as that used for any other dedicated or common channel of the transmitter 110. Thus, no unique or specific processing techniques need be implemented to handle the special circumstances surrounding the removal of the long code and the implementation of the pilot code and long code group codes in conjunction with the broadcast control channel. Second, with the use of individually controlled switches 164 for the channels 116', the transmission of the pilot codes and long code groups codes, for example, need not necessarily coincide in time. Issues concerning the maintenance of orthogonality between the codes of the channels 116' used for receiver acquisition operations are thus obviated and the interference imposed onto the dedicated and common channels may be advantageously spread in time. Third, the present implementation increases the channel bit rate of the broadcast control channel over that provided in the prior art. Since a one symbol duration masking of the broadcast control channel is no longer required, that symbol space is made available to carry more broadcast control channel information. This could be used to increase the information rate on the broadcast control channel, or could be used to increase the amount of channel encoding provided on the broadcast control channel. Such increases further serve to compensate for any additional interference caused by common channel 116' transmissions during a common channel 116 broadcast control channel transmission. No other additional adverse affect on interference is experienced with the transceiver 110 implementation in comparison to the implementation of FIGS. 1A and 1B.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A direct sequence, spread spectrum transmitter, comprising:
   a first block of channel equipment for dedicated channels and common channels of the transmitter, comprising:
      a first plurality of spreaders for spreading dedicated/common channel information to generate a plurality of corresponding dedicated/common intermediate signals;
      a first summer for summing the plurality of corresponding dedicated/common intermediate signals; and
      a scrambler for scrambling the summed plurality of corresponding dedicated/common intermediate signals to generate an output signal;
   a second block of channel equipment for acquisition-related channels of the transmitter, comprising:
      a second plurality of spreaders for spreading acquisition-related channel information to generate a plurality of corresponding acquisition-related intermediate signals; and
      switch means for selectively passing the plurality of corresponding acquisition-related intermediate signals; and
   a second summer for summing the selectively passed plurality of corresponding acquisition-related intermediate signals with the output signal comprising the scrambled and summed plurality of corresponding dedicated/common intermediate signals to generate a downlink transmit signal for transmission by the transmitter.

2. The transmitter as in claim 1 wherein the dedicated channels and common channels comprise spread spectrum traffic and control channels.

3. The transmitter as in claim 1 wherein the acquisition-related channels comprise at least one channel with a known modulation.

4. The transmitter as in claim 1 further comprising:
a power adjustment device for making a power level selection on each intermediate signal.

5. The transmitter as in claim 4 wherein the power adjustment device further coordinates power level selection on at least one of intermediate signals to account for the selective passing of the plurality of corresponding acquisition-related intermediate signals to be summed with the output signal.

6. The transmitter as in claim 1 wherein the first plurality of spreaders apply codes from a first orthogonal code set in spreading the dedicated/common channel information.

7. The transmitter as in claim 6 wherein the second plurality of spreaders apply codes not belonging to the first orthogonal code set in spreading the acquisition-related channel information.

8. The transmitter as in claim 1 wherein the scrambler applies a long code, whose identity is indicated by the spread acquisition-related channel information, in scrambling the summed plurality of corresponding dedicated/common intermediate signals.

9. The transmitter as in claim 8 wherein the acquisition-related channel comprises a long code group code channel, the long code group code providing an indication of the selected long code used by the second plurality of spreaders in scrambling the summed plurality of corresponding dedicated/common intermediate signals.

10. A method for separated processing of direct sequence spread spectrum channel information, comprising the steps of: for dedicated/common channel information:
spreading the dedicated/common channel information to generate dedicated/common intermediate signals;
summing the generated dedicated/common intermediate signals together; and
scrambling the summed dedicated/common intermediate signals; for acquisition-related channel information:
spreading the acquisition-related channel information to generate a acquisition-related intermediate signal; and
selectively passing the generated acquisition-related intermediate signal; and
for both dedicated/common and acquisition-related channel information:
adding the selectively passed acquisition-related intermediate signal to the scrambled and summed dedicated/common intermediate signals to generate a downlink transmit signal for transmission.

11. The method as in claim 10 wherein the step of spreading the dedicated/common channel information comprises the step of applying codes from a first orthogonal code set to effectuate the spreading.

12. The method as in claim 11 wherein the step of spreading the acquisition-related channel information comprises the step of applying codes not belonging to the first orthogonal code set to effectuate the spreading.

13. The method as in claim 10 wherein the dedicated channels and common channels comprise a spread spectrum traffic and control channels.

14. The method as in claim 10 wherein the acquisition-related channel comprises at least one channel with a known modulation.

15. The method as in claim 10 further comprising the step of adjusting a power level of at least one intermediate signal.

16. The method as in claim 15 wherein the step of adjusting further comprises the step of coordinating adjusted power level on at least one intermediate signal to account for the selective passing of the acquisition-related intermediate signal to be added to the scrambled and summed dedicated/common intermediate signals.

17. The method as in claim 10 wherein the step of scrambling comprises the step of applying a long code, whose identity is indicated by the spread acquisition-related channel information, in scrambling the summed dedicated/common intermediate signals.

18. The method as in claim 17 wherein the acquisition-related channel comprises a long code group code channel, the long code group code providing an indication of the long code applied in scrambling the summed dedicated/common intermediate signals.

* * * * *

UNITED STATES PATENT AND TRADEMARK OFFICE
CERTIFICATE OF CORRECTION

PATENT NO. : 5,956,368
DATED : Sep. 21, 1999
INVENTOR(S) : Karim Jamal et al.

It is certified that error appears in the above-identified patent and that said Letters Patent is hereby corrected as shown below:

Column 5, line 52    Replace "conjugate $C_1$"
                     With --conjugate $C_1^*$--

Attorney, Agent, or Firm
                     Replace "Jenkins"
                     With --Jenkens--

Signed and Sealed this

Tenth Day of April, 2001

Attest:

NICHOLAS P. GODICI

*Attesting Officer*    *Acting Director of the United States Patent and Trademark Office*